United States Patent
Agate, Sr. et al.

(10) Patent No.: US 6,571,427 B2
(45) Date of Patent: Jun. 3, 2003

(54) GEAR SHIFT LEVER HANDLE CONSTRUCTION

(76) Inventors: Donald Lee Agate, Sr., 7075 W. Gowan, #1130, Las Vegas, NV (US) 89129; Diane Marie Agate, 7075 W. Gowan, #1130, Las Vegas, NV (US) 89129

( * ) Notice: Subject to any disclaimer, the term of this patent is extended or adjusted under 35 U.S.C. 154(b) by 0 days.

(21) Appl. No.: 09/855,060

(22) Filed: May 15, 2001

(65) Prior Publication Data

US 2002/0170144 A1 Nov. 21, 2002

(51) Int. Cl.⁷ .................................................. G05G 1/06
(52) U.S. Cl. ........................ 16/441; 16/DIG. 12; 74/523
(58) Field of Search .......................... 16/441, DIG. 12; 74/523; D12/179; D8/310–312

(56) References Cited

U.S. PATENT DOCUMENTS

| | | | |
|---|---|---|---|
| D106,094 S | 9/1937 | Lipe | D12/113 |
| D209,902 S | 1/1968 | Watson | D8/307 |
| D214,786 S | 7/1969 | Meiluta | D8/307 |
| D215,276 S | 9/1969 | Spargo | D8/307 |
| D218,602 S | 9/1970 | Malasky | D12/179 |
| 3,941,009 A | * 3/1976 | Brown | 74/543 |
| D368,011 S | * 3/1996 | McCoy | D8/303 |
| 5,577,417 A | * 11/1996 | Fournier | 74/523 |
| D426,136 S | * 6/2000 | Yu | D8/107 |
| D448,646 S | * 10/2001 | Sargentelli | D8/303 |

* cited by examiner

*Primary Examiner*—Thomas B. Will
*Assistant Examiner*—Tara L. Mayo
(74) *Attorney, Agent, or Firm*—Sturm & Fix LLP

(57) ABSTRACT

A handle construction (10) for a gear shift lever (100) wherein the handle construction (10) is fabricated as a one piece contoured handle member (20) having a generally ovoidal configuration with certain portions missing from the top surface, the front surface, and the left side of the generally ovoidal configuration; wherein, those missing portions define a plurality of elongated arcuate recesses (21) through (24) that are dimensioned to receive a user's fingers, a first extension recess (30) that is dimensioned to receive a user's thumb and a second extension recess (32) to form a raised lip (37) that forms an abutment surface for the heel of a user's palm.

11 Claims, 2 Drawing Sheets

GEAR SHIFT LEVER HANDLE CONSTRUCTION

BACKGROUND OF THE INVENTION

CROSS REFERENCE TO RELATED APPLICATIONS

Not applicable.

1. Field of the Invention

The present invention relates to the field of handles for gear shift levers in general and in particular to a palm and finger conformable handle construction for gear shift levers.

2. Description of Related Art

As can be seen by reference to the following U.S. Pat. Nos. DES. 218,602; DES. 215,276; DES. 214,786; DES. 209,902; DES. 160,094, the prior art is replete with myriad and diverse contoured handle constructions.

While all of the aforementioned prior art constructions are more than adequate for the basic purpose and function for which they have been specifically designed, they are uniformly deficient with respect to their failure to provide a simple, efficient, and practical gear shift lever handle construction that is conformed not only to the user's fingers, but also to the palm of a user's hand to provide the user with a safe, efficient and virtually slip proof ergonomically designed handle construction for gear shift levers.

As virtually all competitive race car drivers are well aware, the ability to control a gear shift lever is of paramount importance in an automotive racing environment and can easily spell the difference in races decided by hundredths or thousandths of a second.

As a consequence of the foregoing situation, there has existed a longstanding need among race car drivers for a new and improved handle construction for gear shift levers that provides the maximum surface area contact between the race car driver's fingers and palm to ensure a positive grip of the handle and control of the gear shift lever; and the provision of such a construction is the stated objective of the present invention.

BRIEF SUMMARY OF THE INVENTION

Briefly stated, the handle construction for gear shift levers that forms the basis of the present invention comprises in general a one piece contoured handle member having a generally ovoidal configuration with certain portions missing from the top surface, the front face and the left side of the handle member.

As will be explained in greater detail further on in the specification, those missing portions of the ovoidal configuration define: a plurality of arcuate recesses that are dimensioned to receive a user's fingers, a first extension recess that is dimensioned to receive a user's thumb, and a second extension recess that cooperates with the first extension recess to create a raised lip on the rear portion of the top surface of the handle member that forms an abutment surface for the heel of the user's palm.

In addition, all of the aforementioned recesses in the front face, top surface, and left side of the handle member fall within an area that is outlined by a tortuously configured continuous line that defines a three dimensional closed loop.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
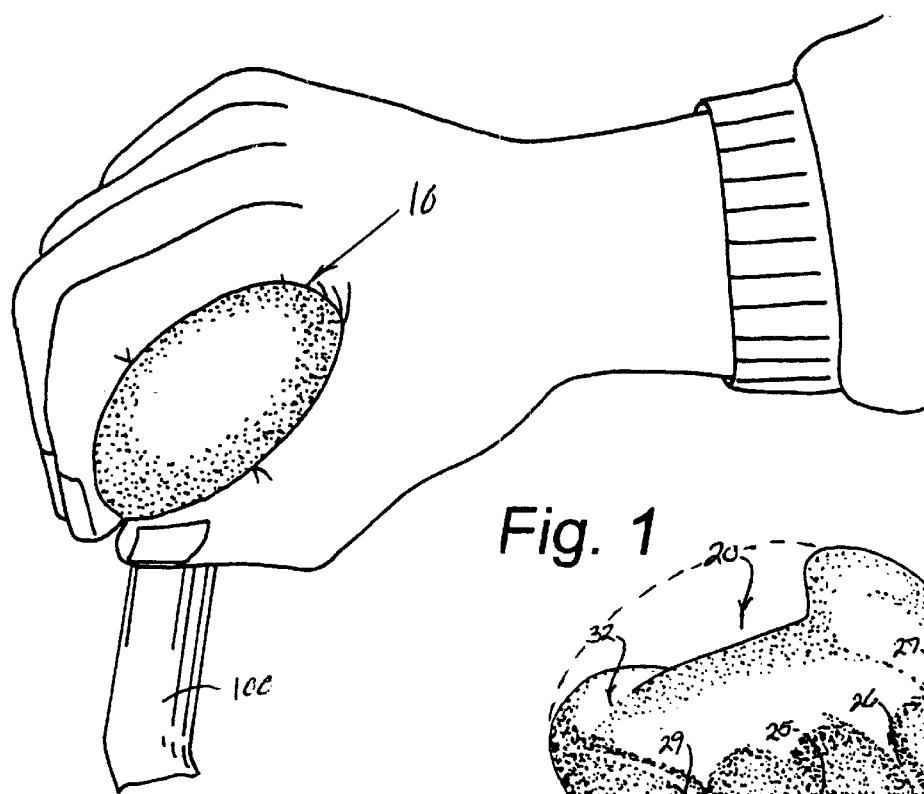
FIG. 1 is a perspective view of the handle construction in use with a gear shift lever.

As can be seen by reference to the drawings, and in particular to FIG. 1, the handle construction that forms the basis of the present invention is designated generally by the reference number 10. The construction 10 comprises in general a one-piece contoured handle member 20 fabricated from hard plastic or the like wherein the various exterior surfaces are uniquely configured to conform to a user's hand as will be described presently.

As can best be appreciated by reference to FIGS. 2 through 4, and FIG. 6, the front face of the handle member 20 is provided with four elongated arcuate recesses 21 22 23 24 which extend from the lower portion of the handle member 20.

In addition, the front face of the handle member is provided with a plurality of raised relatively narrow arcuate ribs 25 26 27 formed intermediate the recesses 21 22 23 24 which are further flanked by a pair of more rounded protrusions 28 and 29 whose purpose and function will be described presently.

As can best be seen by reference to FIGS. 3 through 5, and FIG. 7, recess 21 is provided with a variable depth extension recess 30 on the left side of the handle member wherein the extension recess 30 is dimensioned to receive and partially surround a portion of the user's thumb while also cooperating with recess 21 to define an outwardly extending curved band 31 on the left side of the handle member 20.

Figure 2:
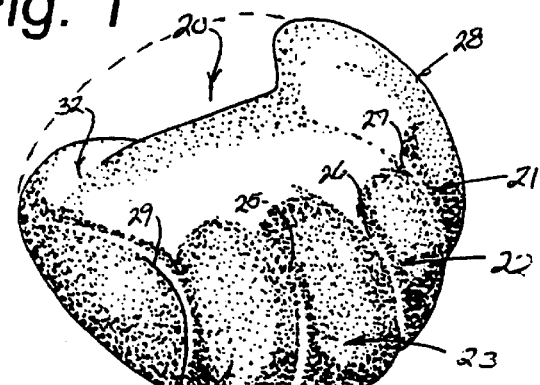
FIG. 2 is a front perspective view of the handle construction.
Figure 5:
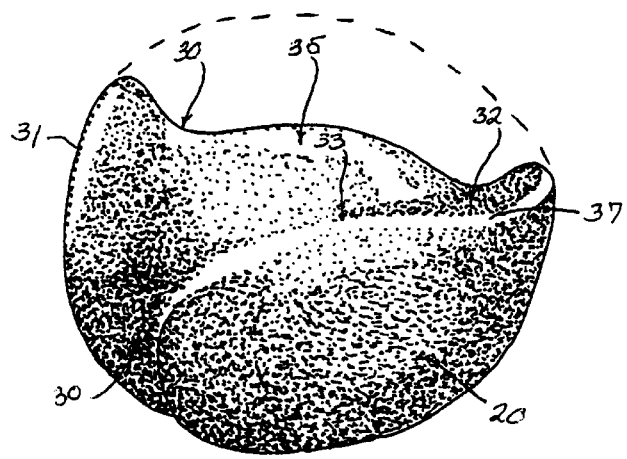
FIG. 5 is a rear elevation view.
Figure 6:
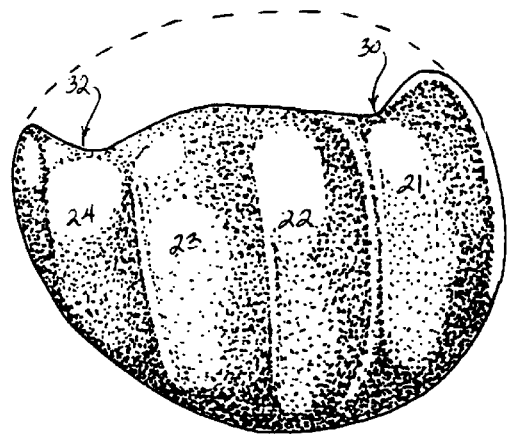
FIG. 6 is a front elevation view.
Figure 7:
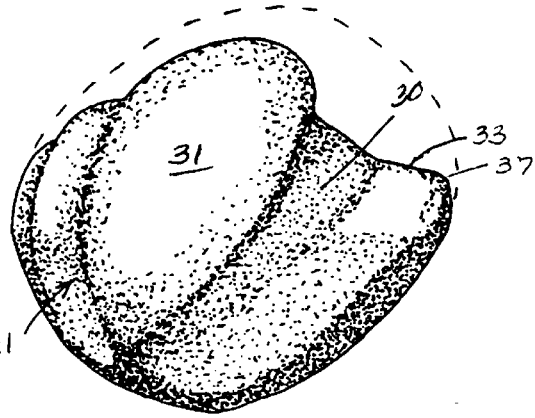
FIG. 7 is a left side elevation view.
Figure 8:
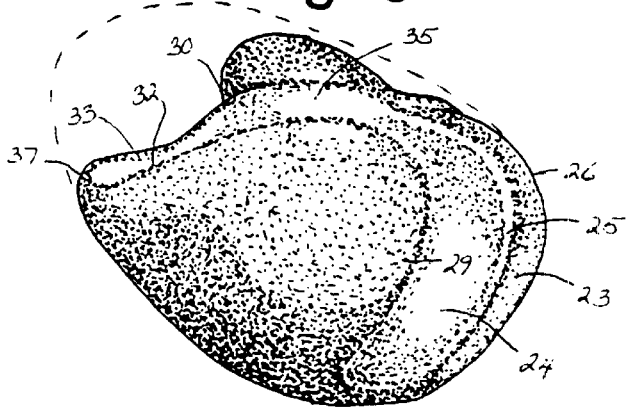
FIG. 8 is a right side elevation view.

Furthermore, as shown in FIGS. 2, 5, and 8, recess 24 is provided with a shallow extension 32 which follows an arcuate path on the top surface of the handle member 20 wherein the arcuate path generally conforms to the right hand side and rear portion of the top surface of the handle member 20; and wherein the extension recesses 30 and 32 are seamlessly joined together at a slightly raised portion 33 formed proximate the midpoint of the rear portion of the top surface of the handle member 20 wherein the raised portion 33 is dimensioned to conform to the seam at the base of a user's palm.

In addition, as shown in FIGS. 2, 3, 5, and 8, the central center of the top surface of the handle member is provided with a pronounced raised portion 35 that is dimensioned to conform to the center of a user's palm and provide a resting or bearing surface therefor.

Figure 3:
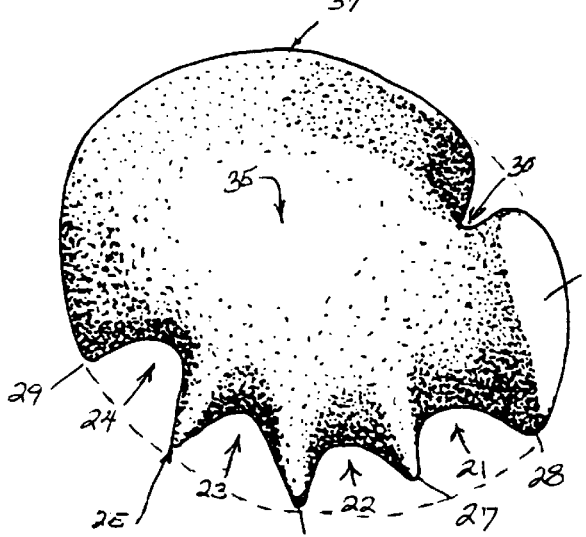
FIG. 3 is a top plan view of the handle construction.

As can best be appreciated by reference to FIGS. 3, 5, and 8, the rearward portions of the extension recesses 30 and 32 form a raised lip 37 that forms an abutment surface for the heel of the user's palm.

Figure 4:
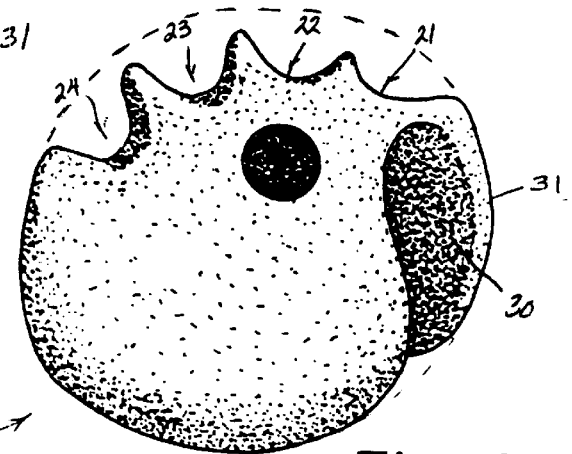
FIG. 4 is a bottom plan view of the handle construction rotated 180° from the orientation of FIG. 3.

Furthermore, as shown in FIG. 4, the bottom surface of the handle member 20 is provided with an aperture 39 that is dimensioned to receive an adapter element (not shown) for operatively connecting the handle member 20 to a gear shift lever 100 as depicted in FIG. 1.

As can best be appreciated by reference to FIGS. 2 through 8, the handle member 20 has a generally ovoidal configuration as indicated by the dashed lines wherein the recesses 21 through 24 and 30 32 and those portions of the top surface of the handle member 20 that form the raised portion 35 of the palm supporting surface represent the missing portions of the ovoidal configuration.

In addition, it should further be noted that those missing portions of the ovoidal configuration are outlined by a continuous line that travels along the outermost periphery of the handle member.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

We claim:

1. A handle construction for a gear shift lever wherein the handle the handle construction comprises:

a contoured handle member having a generally ovoidal configuration with selected portions missing wherein the selected portions conform to the bottom surface of a user's hand including the fingers, thumb, and palm and further having means provided on the rear portion of the handle member for abutting against the heel of the user's palm;

wherein, the missing portions of the generally ovoidal configuration are outlined along an unbroken line defining a contoured closed loop, and further defining a front face having a plurality of elongated arcuate recesses separated by a lesser plurality of raised relatively narrow arcuate ribs.

2. The construction as in claim 1; wherein, the handle member is also provided with a top surface, a left side, and a first extension recess which extends rearwardly from one of said plurality of recesses along said top surface and downwardly along said left side to form a curved band that is partially encircled by said first extension recess wherein a portion of said first extension recess is dimensioned to partially surround a user's thumb.

3. The construction as in claim 2; wherein, the handle member also has a right side and is further provided with a second extension recess that extends rearwardly from another one of said plurality of recesses along the right side of the top surface of the handle member in a generally spaced parallel fashion relative to the right side of the handle member.

4. The construction as in claim 3; wherein, the top surface of the handle member has a rear portion provided with a first slightly raised portion dimensioned to conform to the seam at the base of a user's palm.

5. The construction as in claim 4, wherein, both the first and second extension recesses extend onto the rear portion of the top surface of the handle member and are joined at said first slightly raised portion.

6. The construction as in claim 5; wherein, the top surface of the handle member is further provided with a second pronounced raised portion that is dimensioned to conform to the center of the user's palm.

7. The construction as in claim 6; wherein, the outer edges of the first and second extension recesses define a raised lip that forms an abutment surface for the heel of the user's palm.

8. The construction as in claim 7; wherein, the handle member is further provided with a bottom surface having an aperture dimensioned to receive a portion of a gear shift lever.

9. The construction as in claim 8; wherein, the handle member is fabricated as a single piece.

10. A handle construction for a gear shift lever wherein the handle construction comprises a one piece contoured handle member having a generally ovoidal configuration with certain portions missing from the top surface, the front surface and the left side of the ovoidal configuration; wherein the missing portions define: a plurality of arcuate recesses that are dimensioned to receive a user's fingers; a first extension recess that is dimensioned to receive a user's thumb; and a second extension recess that cooperates with the first extension recess to create a raised lip that forms an abutment surface for the heel of a user's palm.

11. The construction as in claim 10; wherein, the location of said missing portions are outlined by a tortuously configured continuous line that defines a three dimensional closed loop.

* * * * *